Patented Jan. 21, 1936

2,028,480

UNITED STATES PATENT OFFICE 2,028,480

WATERINSOLUBLE AZODYESTUFFS

Richard Stüsser, Cologne-Deutz, Germany, assignor to General Aniline Works, Inc., New York, N. Y., a corporation of Delaware No Drawing. Application January 27, 1933, Serial No. 653,928. In Germany February 8, 1932

6 Claims. (Cl. 260—44.2)

The present invention relates to new water-insoluble azodyestuffs, more particularly it relates to dyestuffs which may be represented by the probable general formula:

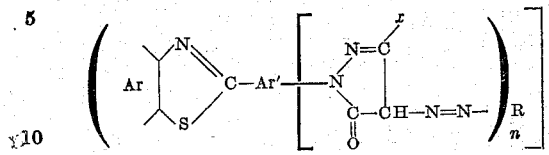

wherein the nitrogen atom in the 1-position of the pyrazolone nucleus is attached to a carbon atom of Ar or Ar', Ar and Ar' stand for aromatic radicals, such as radicals of the benzene or naphthalene series, $x$ stands for alkyl, a radical of the phenyl series or an esterified carboxylic acid group, R stands for the radical of a diazotized aromatic amine, wherein the nuclei may be substituted by substituents which do not cause solubility in water, for example by alkyl, alkoxy, halogen and the nitro group, and wherein one $n$ stands for the number 1 and the other $n$ stands for the number 1 or 2.

My new dyestuffs are obtainable by diazotizing or tetrazotizing in the usual manner a diazotization component free from a group inducing solubility in water and coupling with one or two molecular proportions respectively of a pyrazolone of the general formula:

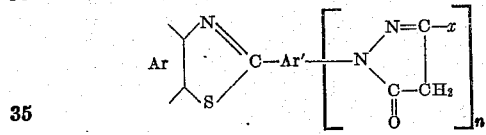

wherein Ar, Ar' and $x$ mean the same as stated above and wherein $n$ stands for the number 1 or 2.

The coupling components used in my invention are obtainable for example, by diazotizing or tetrazotizing the corresponding mono- or di-amino-arylthiazoles, reducing the same in the usual manner to the hydrazines, and condensing the hydrazines with an acetic acid ester, such as aceto acetic acid ester, benzoyl acetic acid ester, oxalic acetic acid ester.

My new dyestuffs can be prepared in substance or on a substratum, such as on vegetable fibres. The dyeings prepared on the fibre according to the usual methods of preparing ice colors are distinguished by a good fastness to washing and to light. The shades obtained depend on the specific diazotization components used.

The invention is illustrated by the following examples, without being limited thereto:

*Example 1.*—138 grams of 2-nitro-1-aminobenzene are diazotized in the usual manner and added to a suspension of 321 grams of the pyrazolone of dehydrothiotoluidine of the formula:

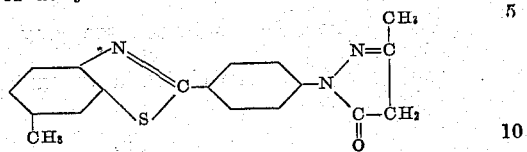

said suspension being prepared by dissolving the pyrazolone in dilute aqueous caustic soda and precipitating by the addition of acetic acid. A watersoluble yellow azodyestuff of the probable formula:

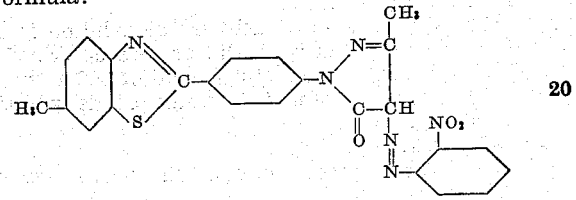

separates. It is filtered and can be used as pigment in the manufacture of lakes.

The coupling component used is prepared in the following manner:

242 grams of dehydrothiotoluidine are diazotized in the usual manner with 400 grams of hydrochloric acid of 22° Bé. and 69 grams of sodium nitrite. When the diazotization is complete, the reaction mixture is poured into one liter of a solution of stannous chloride in hydrochloric acid containing 660 grams of crystallized stannous chloride, care being taken that during the reaction ice is present. The hydrochloride of the hydrazine of the dehydrothiotoluidine soon begins to separate in form of light yellow crystals. It is filtered, washed with water and recrystallized from hot water containing hydrochloric acid. Then it is introduced into one liter of water containing 160 grams of finely divided aceto acetic acid ester and 200 grams of sodium acetate. After 2 hours' stirring the reaction mixture is rendered alkaline by the addition of aqueous soda solution. Stirring is continued for one hour, and then caustic soda is added until the mixture is reacting caustic alkaline, and by heating and adding water rather the whole insoluble matter is brought into solution. The solution is then filtered, and by acidifying the filtrate, the pyrazolone of the dehydrothiotoluidine is precipitated. After recrystallizing the same from toluene or alcohol it is obtained as a yellowish crystalline substance which is soluble in dilute caustic alkalies.

*Example 2.*—5 grams of the dehydrothiotoluidinepyrazolone used in Example 1 are dissolved in some hot water with the addition of caustic soda and Turkey red oil, and the solution is filled up with water to one liter. To the impregnating bath thus obtained 14 grams of common salt are added, and 50 grams of cotton yarn are impregnated therewith for half an hour at about 30° C. Then the cotton is squeezed and introduced into a diazo solution prepared from a diazotization component free from a group inducing solubility in water. Coupling is effected by neutralizing the mineral acid by the addition of sodium acetate or sodium bicarbonate. Depending upon the specific diazotization component there are obtained yellow, orange, brown or red dyeings. Thus for example:

5-chloro-2-methyl-1-aminobenzene yields a yellow.

2-aminoanthraquinone yields an orange.

4-amino-3,2'-dimethylazobenzene yields a yellowish-brown.

4-benzoylamino-2,5-dimethoxy-1-aminobenzene yields a red.

The dyeings thus obtained are very fast to washing.

The pyrazolone of the dehydrothioxylidine of the formula:

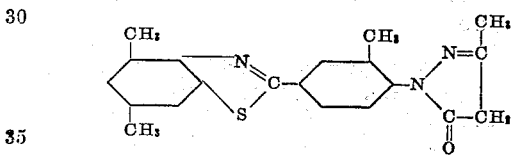

yields similar shades.

This pyrazolone of dehydrothioxylidine is obtainable analogously to the process described in Example 1, using thereby instead of 242 grams of dehydrothiotoluidine 270 grams of dehydrothioxylidine.

I claim:

1. Waterinsoluble azodyestuffs of the general formula:

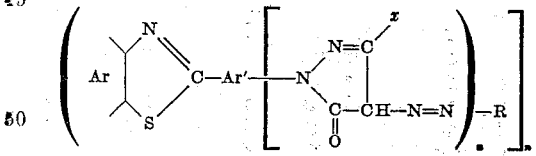

wherein the nitrogen atom in the 1-position of the pyrazolone nucleus is attached to a carbon atom of Ar or Ar', Ar and Ar' stand for radicals of the benzene or naphthalene series, $x$ stands for alkyl, a radical of the phenyl series or an esterified carboxylic acid group, R stands for the radical of a diazotized aromatic amine, and wherein one $n$ stands for the number 1 and the other $n$ stands for the number 1 or 2, yielding, when produced on the fiber, dyeings fast to washing.

2. Waterinsoluble azodyestuffs of the general formula:

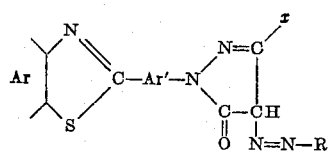

wherein the nitrogen atom in the 1-position of the pyrazolone nucleus is attached to a carbon atom of Ar or Ar', Ar and Ar' stand for radicals of the benzene or naphthalene series, $x$ stands for alkyl, a radical of the phenyl series or an esterified carboxylic acid group, R stands for the radical of a diazotized aromatic amine, yielding, when produced on the fiber, dyeings fast to washing.

3. The dyestuff of the formula:

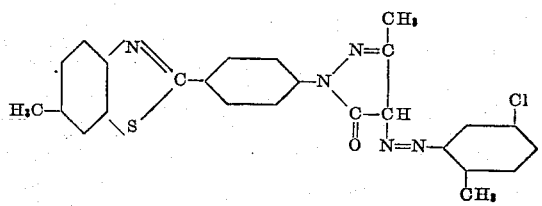

yielding, when produced on the fiber, yellow shades of good fastness to washing.

4. Fiber dyed with a dyestuff as claimed in claim 1.

5. Fiber dyed with a dyestuff as claimed in claim 2.

6. Fiber dyed with the dyestuff as claimed in claim 3.

RICHARD STÜSSER.